TELEPHONE INDEX

Filed Nov. 24, 1961 2 Sheets-Sheet 1

INVENTOR.
ROGER LEVESQUE
BY Arthur H. Seidel
ATTORNEY

INVENTOR.
ROGER LEVESQUE
BY Arthur H. Seidel
ATTORNEY

United States Patent Office 3,073,049

Patented Jan. 15, 1963

3,073,049

TELEPHONE INDEX

Roger Levesque, 127 Cunningham Ave., Upper Darby, Pa.

Filed Nov. 24, 1961, Ser. No. 154,534

11 Claims. (Cl. 40—104)

The present invention relates to a telephone index, and more particularly to a push button operated telephone index which will automatically open to the desired listing.

In the home of in an office it is desirable to have an index of the telephone numbers and addresses which are most often used. Such an index should provide for the listings to be arranged in alphabetical order according to the names of the parties. Also, such an index should provide for ease of finding any desired listing. In addition, the index should be relatively small and compact.

It is an object of the present invention to provide a novel telephone index.

It is another object of the present invention to provide a push button type telephone index which automatically opens to the desired listing.

It is a further object of the present invention to provide a push button type telephone index which is easy to operate.

It is still another object of the present invention to provide a push button type telephone index which is relatively small and compact.

Other objects will appear hereinafter.

For the purpose of illustrating the invention there is shown in the drawings a form which is presently preferred; it being understood, however, that this invention is not limited to the precise arrangements and instrumentalities shown.

Figure 1:
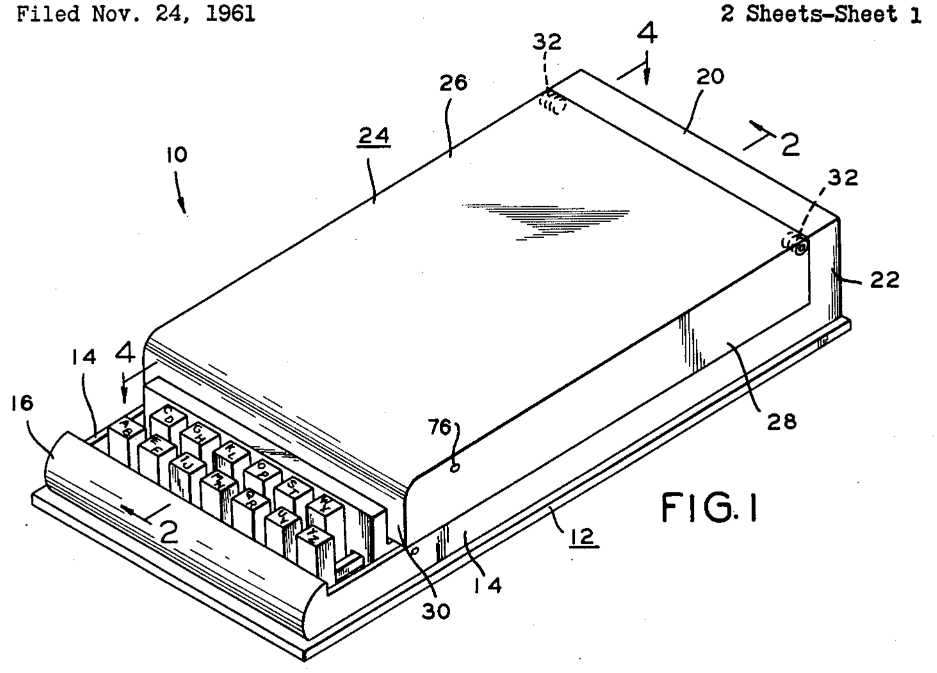
FIGURE 1 is a perspective view of the telephone index of the present invention.
Figure 2:
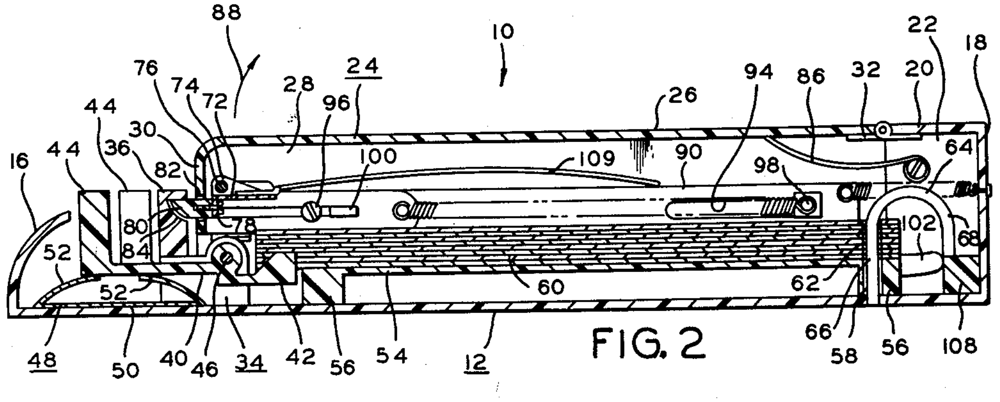
FIGURE 2 is a sectional view taken along line 2—2 of FIGURE 1.

Referring initially to FIGURES 1 and 2 of the drawing, the telephone index of the present invention is generally designated as 10.

Index 10 comprises a base 12 having a pair of upright side walls 14, an arcuate front wall 16, and an upright rear wall 18. The rear wall 18 is higher than the side walls 14, and has forwardly extending flanges 20 and 22 extending from its top and side edges respectively. A cover 24 extends along the base 12. The cover 24 has a top 26, a pair of downwardly extending side walls 28, and a downwardly extending front wall 30. The cover 24 is hingedly secured to the base 12 by a pair of hinges 32 which are connected between the back edge of the top 26 of the cover 24 and the front edge of the top flange 20 of the back wall 18 of the base 12. The cover 24 is of a width equal to the distance between the side walls 14 of the base 12, and the cover 24 is shorter than the length of the base 12. Thus, when the cover 24 is in its position extending along the base 12, the front wall 30 of the cover 24 is spaced from the front wall 16 of the base 12.

A support wall 34 extends across and is securedly mounted on the base 12 beneath the front wall 30 of the cover 24. A partition wall 36 extends upwardly from the support wall 34 in front of the front wall 30 of the cover 24. The support wall 34 has thirteen openings 38 therethrough at uniformly spaced intervals along the support wall 34. A separate arm 40 extends through each of the openings 38. Each of the arms 40 has a flange 42 extending upwardly from its rear end, and an upright push button 44 on its front end. A rod 46 extends through the support wall 34 and crosses each of the openings 38. The rod 46 slidably extends through each of the arms 40 between the ends of the arms so that each of the arms 40 is pivotally mounted on the rod 46. The rod 46 is spaced a uniform distance from the back end of each of the arms 40. However, the odd numbered arms 40 are longer than the even numbered arms so that the odd numbered push buttons 44 are in a row in front of the row of the even numbered push buttons 44, as shown in FIGURE 1. As shown in FIGURE 1, the top surface of each of the push buttons 44 is provided with two consecutive letters, and the push buttons 44 are lettered consecutively from the left hand side to the right hand side as viewed in FIGURE 1.

Figure 3:
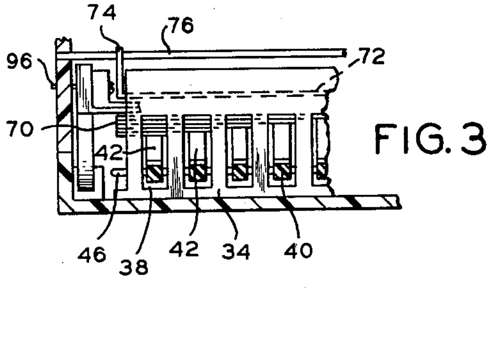
FIGURE 3 is a sectional view taken along line 3—3 of FIGURE 4.
Figure 4:
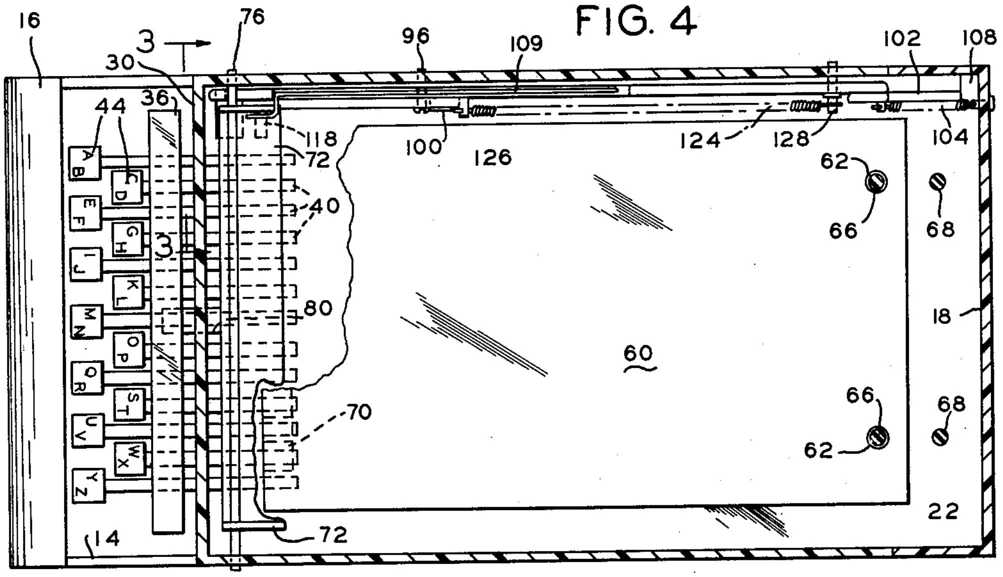
FIGURE 4 is a sectional view taken along line 4—4 of FIGURE 1.

As shown in FIGURE 3, the flanges 42 at the back ends of the arms 40 are of increasing height from the left hand side of the index 10 to the right hand side. Thus, the flange 42 on the "AB" arm 40 is the shortest flange, and the flange 42 on the "YZ" arm 40 is the longest flange.

A spring member 48 extends across the base 12 beneath the front ends of the arms 40. Spring member 48 comprises a base strip 50, and a plurality of spring fingers 52 extending upwardly and toward each other from the sides of the base strip 50. Each of the spring fingers 62 extends beneath and engages one of the arms 40 just below the push button 44. The spring arms 52 are stiff but resilient so that the spring arms 52 permit pivotation of the arms 40, but normally retain the arms 40 in a position substantially parallel to the base 12.

A platfrom 54 is mounted on the base 12 beneath the cover 24. The platform 54 extends from the back ends of the arms 40 to the back end of the cover 24, and has a pair of legs 56 supporting the platform in spaced relation with respect to the base 12. The back leg 56 of the platform 54 has a pair of holes 58 therethrough adjacent the sides of the platform 54. A plurality of substantially rectangular index cards 60 are supported in stacked relation on the platform 54. The cards 60 have a pair of aligned holes 62 therethrough which are in alignment with the holes 58 in the back leg 56 of the platform 54. A pair of U-shaped guide posts 64 are mounted in an upright position on the base 12 with one leg 56 of each of the guide posts 64 extending through a separate one of the aligned sets of holes 62 and 58 in the index cards 60 and platform 54. The other leg 68 of each of the guide posts 64 is directly behind the one leg 66, and is removably secured to the base 12. Thus, each of the index cards 60 can be swung upwardly and around the guide posts 64.

The bottommost card 60 is of a length to extend to the front end of the platform 54. The next to the bottommost card 60 has a tab 70 extending forwardly from its front edge over one or more of the flanges 42 of the arms 40. The tabs 70 vary in width with the tab 70 on the next to the bottommost card 60 being the narrowest tab, and the tab 70 on the topmost card 60 being the widest tab. The tab 70 on the next to the bottommost card 60 is of a width to extend across only the flange 42 on the arm 40 having the "AB" button 44. The tab 70 on the next card 60 is of a width to extend across the flanges 42 on both the "AB" and the "CB" arms 40. Thus, the tabs 70 on the cards 60 increase in width to cover one additional flange 42 until the tab 70 on the top most card 60 which extends across all of the flanges 42. Thus, each of the flanges 42 contacts the bottom surface of a tab 70 on a different card 60. As previously described, the flanges 42 are of increasing height from the "AB" arm 40 to the "YZ" arm 40, and each of the flanges 42 is longer than its adjacent flange 42 by an amount equal to the thickness of one index card 60.

A flat actuating plate 72 extends between the sides 28 of the cover 24 adjacent the front wall 30 of the cover 24. The plate 72 has an upright flange 74 at each side thereof. A rod 76 extends through each of the flanges 74 of the plate 72, and the ends of the rod 76 are secured on the side walls 28 of the cover 24. The rod 76 extends through the flanges 74 adjacent the front end of the flanges 74 so that the plate 72 is pivotally mounted adjacent its front edge on the rod 76. The plate 72 is of a length to extend across the front edges of the index cards 60. A flange 78 extends downwardly from the center of the front edge of the plate 72. A locking pin 80 is secured to the flange 78. The locking pin 80 projects through a hole 82 in the front wall 30 of the cover 24. The locking pin 80 has a curved front end so that the top surface of the locking pin 80 is longer than the bottom surface. The partition wall 36 has a recess 84 therein which is adapted to receive the locking pin 80 when the cover 24 is in its closed position substantially parallel to the base 12. Thus, the locking pin 80 engages the top surface of the recess 84 to secure the cover 24 in its closed position.

As shown in FIGURE 2, a spring 86 has one end secured to the side flange 22 of the back wall 18. The other end of the spring 86 engages the inner surface of the top 26 of the cover 24. The spring 86 is under compression so that when the pin 80 is released from the recess 84, the spring 86 will pivot the cover 24 upwardly in the direction of arrow 88 in FIGURE 2, and thereby open the telephone index 10.

An elongated arm 90 is slidably mounted on the inner surface of the side wall 28 of the cover 24. The arm 90 has a pair of elongated holes 92 and 94 extending from side-to-side therethrough. The holes 92 and 94 are elongated longitudinally of the arm 90, with the hole 92 being adjacent the front end of the arm 90 and the hole 94 being adjacent the back end of the arm 90. Screws 96 and 98 extend through the holes 92 and 94 respectively, and are threaded into the side wall 28 of the cover 24 to slidably support the arm 90. A guide lug 100 projects from the side of the arm 90 away from the side wall 28 of the cover 24. The guide lug 100 is positioned just behind the back end of the hole 92 through the front end of the arm 90. A cam member 102 is integral with the back end of the arm 90. Cam member 102 extends downwardly and then curves rearwardly away from the arm 90. A spring 104 is connected in tension between a pin 106 on the back end of the arm 90, and the rear wall 18 of the base 12. The arm 90 is of a length from its front end to the back end of the cam member 102 so that the arm 90 extends from substantially the front wall 30 of the cover 24 to an abutment 108 on the back end of the base 12. The spring 104 pulls the arm 90 rearwardly so that the back end of the cam member 102 engages the abutment 108.

A spring lock member 109 is mounted on the arm 90. The spring lock member 109 comprises a resilient wire having one end secured to the arm 90. The spring lock member 109 extends longitudinally along top edge of the arm 90 to a point adjacent to but spaced from the front end of the arm 90. The spring lock member 109 is bent away from the side wall 28 of the cover 24 adjacent the front end of the arm 90 to provide a lock arm 110. From the lock arm 110 the spring lock member 109 is bent so that the end portion 112 extends over and is seated on the actuaing plate 72. The spring lock member 109 is bent so that the lock arm 110 and the front end portion 112 are resiliently urged downwardly.

A card selector arm 114 extends along the front end portion of the side of the arm 90 away from the side wall 28 of the cover 24. The card selector arm 114 has a hole 116 extending from side-to-side therethrough. The hole 116 is elongated longitudinally along the card selector arm 114. The screw 96 extends through the hole 116 to secure the card selector arm 114 against the arm 90, and the guide lug 100 from the arm 90 extends through the hole 116 in the card selector arm 114 to slidably support the card selector arm 114. At the front end of the card selector arm 114 a flange 118 extends away from the side of the card selector arm 114. The card selector arm 114 has a lip 120 projecting from its top edge adjacent the front end thereof. The lip 120 provides a rearwardly facing shoulder 122. A spring 124 is secured under tension between a pin 126 on the back end of the card selector arm 114, and a pin 128 on the screw 98. The spring 124 tends to pull the card selector arm 114 rearwardly. However, in the closed position of the cover 24 the card selector arm 114 is held in its forward position by the lock arm 110 of the spring lock member 109 which engages the shoulder 122 of the lip 120.

Figures 5, 6, 7:
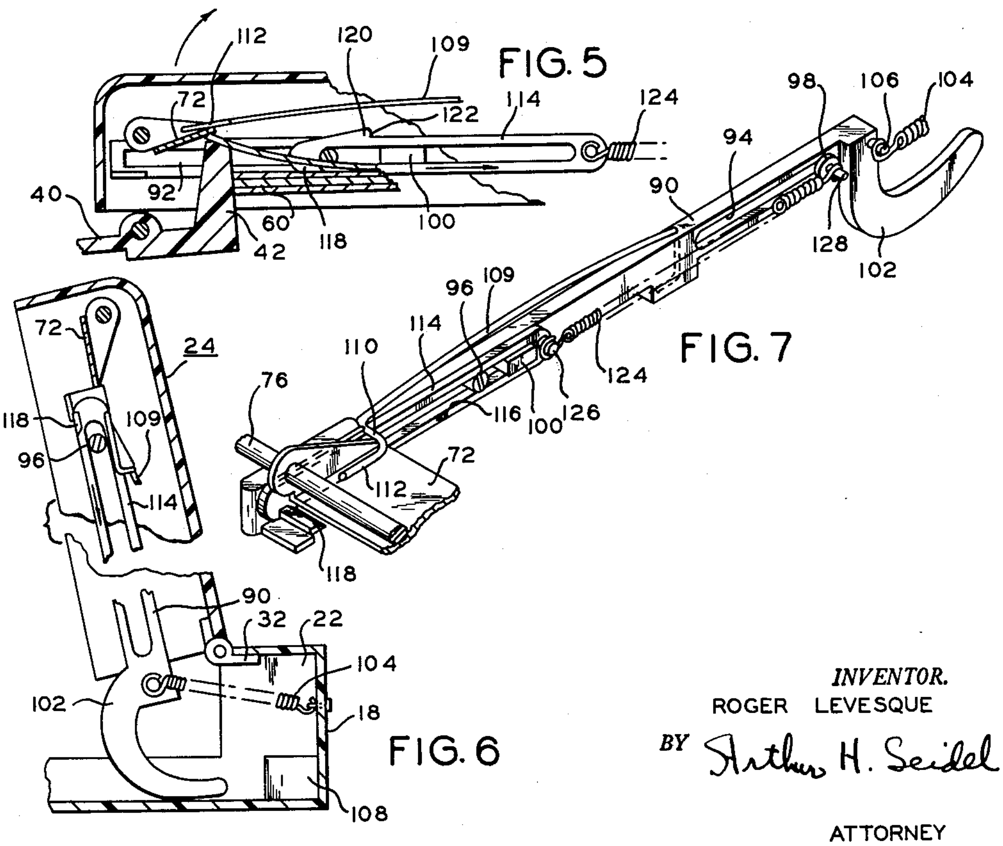
FIGURE 5 is a sectional view through a portion of the telephone index of the present invention showing the initial operation of the telephone index.
FIGURE 6 is a sectional view through a portion of the telephone index in its open position.
FIGURE 7 is a perspective view of the operating arms of the telephone index of the present invention.

The operation of the telephone index 10 of the present invention is as follows:

With the cover 24 in its closed position, the operator presses on the desired buton 44. The pressing downwardly on the button 44 raises the flange 42 on the back end of the arm 40 as shown in FIGURE 5. The upward movement of the flange 42 raises the tabs 70 above the flange 42, and presses the tabs 70 against the back end of the actuating plate 72. This in turn pivots the actuating plate 72, and raises the front end 112 of the spring lock member 109. The lifting of the front end portion 112 of the spring lock member 109 also raises the lock arm 110 of the spring lock member 109, and releases the card selector arm 114. When the card selector arm 114 is released, the spring 124 pulls the card selector arm 114 rearwardly, and slides the flange 118 on the front end of the card selector arm 114 under the bottommost of the raised index cards 60, as shown in FIGURE 5.

The pivotation of the actuating plate 72 also moves the locking pin 80 out of the recess 84 so as to release the cover 24. When the cover 24 is released, the spring 86 pivots the cover 24 upwardly to its open position. The cover 24 carries with it the card selector arm 114. Since the flange 118 of the card selector arm 114 is engaging the bottom surface of the bottommost of the raised cards 60, the swinging of the cover 24 also lifts all of the raised index cards 60 and pivots such cards around the guide posts 64. Thus, when the cover 24 swings to its open position, the index cards 60 left on the top of the stack of index cards have the listings corresponding to the letters on the pressed push button 44.

When the cover 24 swings to its open position, the spring 104 pulls the arm 90 rearwardly with respect to the cover 24, as shown in FIGURE 6. Since the card selector arm 114 is already in its rearmost position, the arm 90 will move with respect to the card selector arm 114 until the front end of the arm 90 is again juxtaposed to the card selector arm 114, and the locking arm 110 of the spring lock member 109 is again seated against the shoulder 122 of the lip 120 on the card selector arm 114. When the arm 90 is in its rearmost position, the cam member 102 engages the base 12, as shown in FIGURE 6

To re-close the index 10, the cover 24 is manually pressed downwardly to swing the cover 24 back down toward the base 12. As the cover 24 is swung downwardly, the cam member 102 engages the base 12, and forces the arm 90 forwardly with respect to the cover 24. Since the lock arm 110 of the spring lock member 109 is behind the shoulder 122 of the lip 120 of the card selector arm 114, the forward movement of the arm 90 also moves the card selector arm 114 forwardly. Thus, as the cover 24 is swung back to its closed position, the arm 90 and the card selector arm 114 are moved forwardly with respect to the cover 24 until the front end portion 112 of the spring lock member 109 is back over the actuating plate 72. The cover 24 is pressed downwardly until the locking pin 80 is slid back into the recess 84 to lock the cover 24 in its closed position. The index 10 is then in condition to be re-opened to any desired index card.

The present invention may be embodied in other specific forms without departing from the spirit or essential attributes thereof and, accordingly, reference should be made to the appended claims, rather than to the foregoing specification as indicating the scope of the invention.

I claim:

1. A telephone index comprising a base, a cover extending across said base and hingedly connected at its back end to said base, a plurality of parallel operating arms pivotally mounted on said base in spaced relation along the front end of said cover, said arms being pivotally supported between their ends with the back ends of the arms being under said cover and the front ends of the arms being in front of said cover, each of said arms having an upright flange on its back end and an upright button on its front end, a plurality of index cards mounted on said base under said cover, the front ends of said cards extending over the flanges on said operating arms with each of said flanges engaging a separate one of said cards, an index card selector arm slidably mounted along a side of said cover, said selector arm having a flange extending toward said index cards from its front end, said selector arm being slidable between a forwardmost position in which the selector flange is in front of said index cards and a rearwardmost position in which the selector flange is under said index cards, spring means for sliding said selector arm from its forwardmost position to its rearwardmost position, means for releasably holding said selector arm in its forwardmost position, means operated by pivoting one of said operating arms to release said selector arm, and means for returning said selector arm to its forwardmost position.

2. A telephone index in accordance with claim 1 in which the cover is pivotal between a closed position in which it extends over and is substantially parallel to the base and an open position in which it extends away from said base, spring means urging said cover to its open position, and means releasably securing said cover in its closed position, said cover securing means being released upon the pivotation of one of said operating arms.

3. A telephone index in accordance with claim 2 including a flat operating plate extending across the inner surface of the cover adjacent the front end of said cover, said operating plate extending across the operating arms with the back end of said operating plate being over the flanges on said operating arms, said operating plate being pivotally supported adjacent its front end on said cover, said operating plate actuating the selector arm holding means to release the selector arm and the cover securing means to release the cover upon pivotation of an operating arm.

4. A telephone index in accordance with claim 3 in which the means for releasably securing the cover in its closed position comprises a locking pin secured to the front of the operating plate and projecting beyond the front of said cover, and an upright wall extending from the base in front of said cover, said wall having a recess adapted to receive the locking pin to secure the cover in its closed position.

5. A telephone index in accordance with claim 4 in which the means holding the selector arm in its forwardmost position and the means for returning the selector arm to its forwardmost position comprises an elongated arm slidably mounted on the cover juxtaposed to the selector arm, said elongated arm slidable between a forwardmost position and a rearwardmost position, spring means urging the elongated arm toward its rearwardmost position, means holding the elongated arm in its forwardmost position when the cover is in its closed position, a wire spring arm secured at its back end to the elongated arm and extending along the top of the elongated arm, said spring arm having a locking portion extending transversely across the selector arm and a portion extending over the actuating plate, and said selector arm having an upwardly extending lip providing a rearwardly facing shoulder, the locking portion of said spring arm adapted to engage the shoulder of said lip and hold the selector arm in its forwardmost position.

6. A telephone index in accordance with claim 5 in which the cover has a side wall juxtaposed to the elongated arm, said elongated arm has a pair of longitudinally elongated holes therethrough adjacent the ends of the elongated arm, a separate screw extending through each of said holes and secured in the side of the cover to slidably support said elongated arm, and the selector arm has a longitudinally elongated hole therethrough, the screw extending through the front hole in the elongated arm extending through the hole in said selector arm to slidably support the selector arm.

7. A telephone index in accordance with claim 6 in which the elongated arm has a guide lug extending from its side and projecting into the elongated hole in the selector arm to support the selector arm.

8. A telephone index in accordance with claim 5 including a curved cam member secured to the back end of the elongated arm, said cam member extending downwardly and curved rearwardly from the elongated arm, said cam member engaging the base of the index to move the elongated arm from its rearwardmost position to its forwardmost position during the closing of the cover, and maintaining the elongated arm in its forwardmost position when the cover is closed.

9. A telephone index in accordance with claim 1 in which the buttons on the operating arms are arranged in two parallel rows with alternating buttons being in alternating rows.

10. A telephone index in accordance with claim 9 including spring means seated on the base beneath the front end of the operating arms, said spring means engaging said operating arms to normally maintain the arms substantially parallel to the base.

11. A telephone index in accordance with claim 1 in which the flanges on the back ends of the operating arms are of increasing height from one side of the base to the other.

References Cited in the file of this patent

UNITED STATES PATENTS

| | | |
|---|---|---|
| 2,524,704 | Henderson | Oct. 3, 1950 |
| 2,541,881 | Menning et al. | Feb. 13, 1951 |
| 2,573,534 | Bauer | Oct. 30, 1951 |
| 2,960,781 | Olson | Nov. 22, 1960 |